Patented Dec. 16, 1947

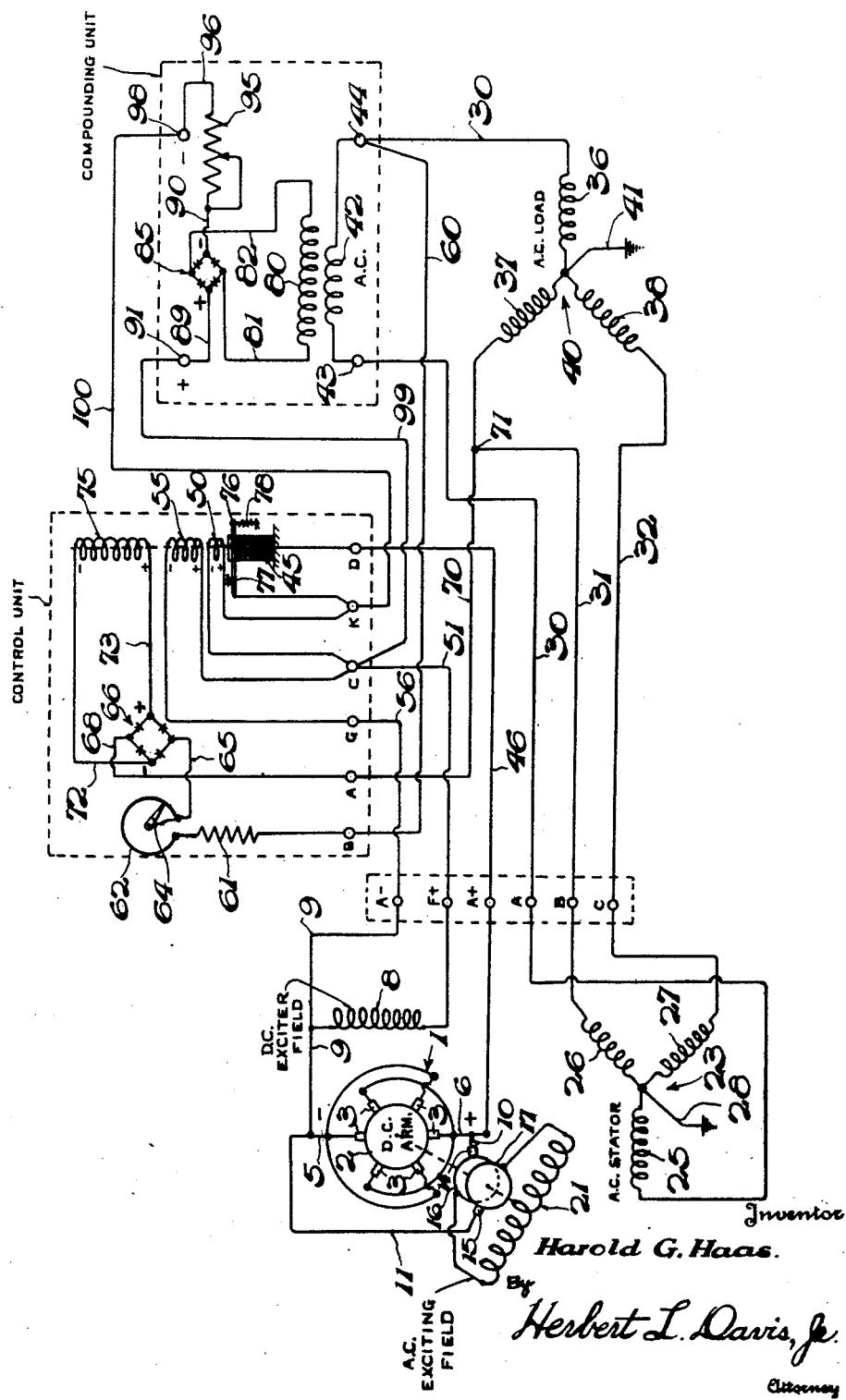

2,432,883

UNITED STATES PATENT OFFICE 2,432,883

ELECTRICAL REGULATOR

Harold G. Haas, Belleville, N. J., assignor to Bendix Aviation Corporation, Teterboro, N. J., a corporation of Delaware Application January 23, 1945, Serial No. 574,112

7 Claims. (Cl. 322—19)

My present invention relates to electrical regulators and more particularly to a novel electrical system whereby hunting of the regulator may be reduced and a controlled voltage maintained at a desired value.

An object of the invention is to provide a novel voltage regulating system for maintaining constant line voltage under changing load conditions.

Another object of the invention is to provide novel means for effecting anti-hunt characteristics in a voltage regulator.

Another object of the invention is to provide novel means for utilizing in an electric device for regulating the output of a generator, the lags in the generator and its output line for differentially timing the proportional (or follow-up) and reset responses of the regulator.

These and other objects and features of the invention are pointed out in the following description in terms of the embodiment thereof which is shown in the accompanying drawing. It is to be understood, however that the drawing is for the purpose of illustration only, and is not designed as a definition of the limits of the invention, reference being had to the appended claims for this purpose.

The figure is a diagrammatic view illustrating a control system embodying one form of my invention.

In the form of the invention shown in the figure, there is provided a direct current generator of conventional type and indicated generally by the numeral 1.

The generator 1 has an armature winding, not shown, but which may be of conventional type. Connections from the armature winding lead to a commutator 2 having brushes 3 and electrical connections leading to output lines 5 and 6, to which there is applied by the generator 1 a negative and positive potential respectively. The generator 1 has an exciter field winding 8 connected at one end to the output line 5 by an electrical conductor 9 which also leads to a terminal A— of a generator set. The opposite end of the exciter field winding 8 is connected by a suitable electrical conductor to a terminal F+ of the generator set.

The output of the generator 1 is controlled by regulating the excitation of the field winding 8 in a manner which will be hereinafter explained.

The output of the direct current generator 1 is also connected through electrical conductors 10 and 11 to brushes 14 and 15 riding on slip rings 16 and 17 respectively, which may be mounted on the drive shaft of the generator 1, not shown.

The slip rings 16 and 17 are connected through electrical conductors 18 and 19 to an exciting field 21 of an alternator having stator windings indicated generally by the numeral 23. The exciting field winding 21 may be mounted on the same drive shaft as the armature 2 and may be rotated in relation to the stator windings 23 so as to induce an alternating current in the stator windings 23 having a value dependent upon the excitation of the winding 21.

The shaft for rotating the armature 2 and exciting field winding 21 may be driven through a suitable constant speed drive from the aircraft engine or other suitable power source.

The stator windings 23 may have windings 25, 26 and 27 grounded at one end thereof through electrical conductor 28.

The windings 25, 26 and 27 are connected to terminals A, B, and C of the generator set and through suitable electrical conductors 30, 31, and 32 to stator windings 36, 37 and 38 respectively, of a suitable alternating current load 40, such as an alternating current motor or other suitable load means. The windings 36, 37 and 38 are grounded through an electrical conductor 41. There is connected in the conductor 30 a primary winding 42 of a transformer. The latter primary winding 42 is connected between terminals 43 and 44 of a compounding unit, the purposes of which will be explained hereinafter.

The excitation of the exciter field winding 8 is controlled preferably by a variable resistance carbon pile element 45 connected at one end by an electrical conductor to a terminal D of a control unit and from which terminal leads an electrical conductor 46 to the terminal A+ of the generator set. The terminal A+ is connected to the positive side of the generator through the conductor 6. The opposite end of the variable resistance 45 is connected by an electrical conductor to a terminal K of the control unit. A second conductor leads from the terminal K to winding 50 of the control unit. The opposite end of the winding 50 is connected to a terminal C and the winding 50 is connected in series with the exciter field winding 8 through a conductor 51 leading from the terminal C to the terminal F+ of the generator set. Thus the variable resistance carbon pile element 45, winding 50, and exciter field winding 8 are connected in series in a circuit leading from the conductor 6 at the positive side of the direct current generator 1 to the conductor 5 at the negative side of the direct current generator 1. Thus the winding 50 is affected by the current applied to the exciter field winding 8 and the variable resistance carbon pile element 45 is arranged to control the excitation of the exciter field winding 8, as will be explained.

There is further provided a winding 55 connected at one end to the terminal C of the control unit and at the opposite end to a terminal G of the control unit. The terminal G of the control unit is connected by an electrical conductor 56 to a terminal A— of the generator set. Thus the winding 55 is connected across the exciter field winding 8 and is effected by the voltage applied to the exciter field winding 8.

There is connected to the condutor 30 through terminal 44 an electrical conductor 60 which leads to a terminal B of the control unit. A resistance winding 61 is connected at one end to the terminal B and at the opposite end to a variable resistance element 62 having a manually adjustable arm 64 for adjusting the resistance thereof, for calibration purposes. The arm 64 of the adjustable resistance 62 is connected through an electrical conductor 65 to a junction of a rectifier bridge 66. The opposite junction of the rectifier bridge 66 is connected through a suitable electrical conductor 68 to a terminal A of the control unit. Leading from the terminal A is an electrical conductor 70 which is connected at 71 to the conductor 31. Output conductors 72 and 73 of the rectifier bridge 66 are connected to opposite ends of a control winding 75. As to this latter arrangement, it will be readily seen that the winding 75 connected through the single phase bridge type rectifier 66 is energized in response to the voltage output across the output lines 30 and 31 of the alternator 23.

The windings 50, 55 and 75 provide electromagnetic means which are so arranged in a carbon pile regulator as to control an armature 76 and thereby the pressure applied to the carbon pile 45. The regulator is shown diagrammatically, in the figure, as including an armature 76 pivoted at 77 and exerting a compressive force upon the carbon pile 45 under tension of a spring 78. The spring 78 is arranged so as to balance the pull on the armature by the electromagnet 75 when energized by a line voltage having a predetermined value and is preferably of a type such as shown in the patent application Serial No. 570,002 of William G. Neild filed December 27, 1944, now U. S. Patent No. 2,427,805, granted September 23, 1947, and assigned to Bendix Aviation Corporation.

Thus as explained in greater detail in the latter application, the regulator is arranged so as to maintain a substantially constant output voltage in the lines 30, 31 and 32 under varying load conditions.

In the arrangement of the figure, the windings 50, 55 and 75 are each arranged in relation to the carbon pile regulator so to apply an electromagnetic force upon the armature 76 controlling the carbon pile and tending to thereby decrease the pressure applied thereto, and thereby increase the resistance of the carbon pile 45, upon an increase in the electromagnetic force exerted thereon.

The winding 75 connected across the rectifier 66 provides the main control for the carbon pile 45 and governs the regulation thereof in accordance with voltage of the lines 30 and 31. Stability is ensured by the anti-hunting windings 50 and 55 which produce a directly proportional relation between line voltage and carbon pile resistance.

The series winding 50 connected in series with the carbon pile 45 has a time constant different from windings 75 and 55 and reacts more rapidly than either of these windings and practically immediately on the carbon pile 45 upon a change in the energization thereof so as to tend to provide a definite low sensitivity or ratio between exciter field 8 current change and lines 30 and 31 voltage change. The winding 50 may for example have only about fifty turns of wire effecting a relatively low resistance.

The sensitivity of the control unit is further lowered by the shunt winding 55 connected across the exciter field 8. The response of the winding 55 to change in voltage across the exciter field 8 is slightly delayed and hence the effect on the carbon pile 45, is thus delayed. The winding 55 may have for example about five hundred turns of wire effecting a relatively greater resistance than winding 50. The winding 55 has a time constant more rapid than winding 75, but slower in response to change than winding 50.

The field series winding 50 and the field shunt winding 55 give the control unit anti-hunt characteristics by tending to adjust the carbon pile resistance 45 in a direction to oppose the voltage surges that occur when the generator hunts. The additional ampere turns of the windings 50 and 55 which increase as load is added to the output lines 30, 31 and 32 of the alternator 23, add to those of the main winding 75 and to give the control unit a drooping voltage characteristic upon load increase.

Thus, if uncompensated, these two windings 50 and 55 together would produce an objectionably large "load error or droop" of line voltage upon an increase of load.

This load error is removed in the form of the invention shown in the figure by providing a compounding unit whose input is the primary winding 42 connected in the conductor 30 and responsive to the load current in one of the three phases.

Inductively coupled to the primary winding 42 is a secondary winding 80 connected through electrical conductors 81 and 82 to opposite junctions of a rectifier bridge 85. Electrical conductors 89 and 90 lead from the output of the rectifier bridge 85. The conductor 89 is connected to an output terminal 91, while the conductor 90 is connected to one end of an adjustable resistance element 95. The opposite end of the resistance element 95 is connected through conductor 96 to the output terminal 98.

The rectifier bridge 85 is so arranged that the alternating current induced in the winding 80 is rectified into a unidirectional full-wave rectified current applying a positive charge to the terminal 91 and a negative charge to the terminal 98. The terminal 91 of the compounding unit is connected by electrical conductor 99 to the terminal C of the control unit, while the terminal 98 is connected by electrical conductor 100 to terminal K of the control unit.

It will be readily seen from the foregoing that the secondary winding 80 of the transformer provides power to the rectifier 85 which power is proportional to the amount of load carried by the output line 30 of the alternator 23, since the current in such line will increase upon increase in load and decrease upon decrease in load.

The terminal C of the control unit is connected to the negative side of the direct current generator 1 through conductor 51 and to the positive side of the compounding unit through conductor 99, while the negative side of the compounding unit is connected to the terminal K through conductor 100. Thus there will be applied across the field series winding 50 from the compounding unit a current producing an electromagnetic force tending to counteract the electromagnetic force produced by the current flowing in an opposite direction to the winding 50 from the direct current generator 1. When a load is supplied to the output lines 30, 31 and 32, the resulting additional current flow in the field series winding 50 tends to produce a magnetic force which subtracts from the total electromagnetic force produced through field series winding 50 and shunt field windings 55 at a lower rate which will tend to balance out the anti-hunt forces provided by the field current and field potential.

The output from the compounding unit is a full-wave rectified current proportional to the load and which current is fed to the winding 50 so as to buck out the effects on windings 50 and 55 of the field current and field potential of exciter 8. The proper balance is obtained by proper adjustment of the resistance 95.

The time constant of the secondary winding 80 is reasonably high and the winding may have for example about 300 turns of wire. Thus starting with a movement of the carbon pile 45 adjusting the resistance thereof, the response of the load current and hence its resetting action is sufficiently delayed so that the anti-hunt windings 50 and 55 can exert the necessary stabilizing action.

In the operation of the regulator system shown in the figure, an increase in the load applied will cause a decrease in the voltage at the output lines 30 and 31 and a decrease in the energization of the winding 75. (Also an increase in the load applied to the alternator 23 will cause an increase in the current in the primary winding 42 and secondary winding 80 energizing the winding 50.) Such decrease in the energization of the winding 75 will cause the spring 78 to adjust the carbon pile 45 in a direction tending to decrease the resistance of the carbon pile 45.

Such decrease in resistance of the carbon pile 45 will cause an increase in energization of the winding 50 from the generator 1, tending to limit the adjustment of the carbon pile 45 in the resistance-decreasing direction. Moreover the increase in the load at the alternator output line 30 will cause the compounding unit to more gradually increase the energization of the winding 50 in an opposite direction from the generator 1, thus tending to counteract the effect of the output voltage change on the winding 50. The resetting action of the compounding unit is sufficiently delayed, however, so that the winding 50 first exerts the necessary stabilizing action.

Further, a decrease in the resistance of the element 45 will increase the energization of the field winding 8 to raise the voltage in the output lines 30, 31 and 32. Likewise, the stated adjustment of the carbon pile 45 will also cause an increase in the energization of the winding 55 as well as the winding 50 which will act in a direction tending to limit the adjustment of the carbon pile 45 in a resistance-decreasing direction and thus prevent over-adjustment of the carbon pile 45.

Moreover, upon such increase in voltage in the output line 30, the current flowing through the primary winding 42 will increase causing a corresponding increase in the current output from the compounding unit to the winding 50 tending to produce a further increased electromagnetic force tending to counter balance the forces set up in the windings 50 and 55 by the power from the generator 1.

However, the response of the alternator 23 to adjustment of the carbon pile 45 is sufficiently slow and the time constant of the secondary winding 80 is sufficiently large that the latter resetting effect upon the winding 50 and 55 by the compounding unit is sufficiently delayed so that the effect of the power from the D. C. generator 1 on the windings 50 and 55 can exert the necessary stabilizing or retarding action.

Of course, upon a decrease in the load an opposite effect is produced in response to such change which likewise causes a stabilizing action.

Although only one embodiment of the invention has been illustrated and described, various changes in the forms and relative arrangements of the parts, which will now appear to those skilled in the art, may be made without departing from the scope of the invention, reference being had to the appended claims for a definition of the limits of the invention.

What is claimed is:

1. A regulating system comprising, in combination, a source of electrical energy, means for controlling a function of the output of said source, means for regulating a condition of said control means in response to the output of said source, means responsive to a change of condition of said control means for temporarily inhibiting further change, and a reset means energized through the output of said source for counteracting said inhibiting effect in a retarded manner.

2. A regulator for a generator supplying line current to a variable load and including an exciter field, comprising a variable resistor, an armature operatively connected thereto, a spring biasing a portion of the armature to tend to operate said resistor in the direction to produce an increase in the exciter field current, a first winding tending to operate the armature in the opposite direction upon an increase of the regulated quantity, a second winding carrying the exciter field current and acting upon the armature as a follow-up promptly limiting the change of resistance of said resistor upon a change of said quantity, a third winding also acting upon the armature and connected across the exciter field, and a reset means energized by said line current for causing at least one of said second and third windings to substantially eliminate the stated follow-up in a retarded manner.

3. The combination set forth in claim 2 in which the reset means comprises a relatively slowly operating means operatively connecting the line with said second winding to gradually introduce a follow-up offsetting action in dependence upon the value of the line current.

4. The combination set forth in claim 2 in which the reset means comprises a relatively slowly operating means including inductive coupling means for connecting the line with said second winding to gradually introduce a follow-up offsetting action in dependence upon the value of the line current.

5. A line voltage regulator for a generator supplying line current to a variable load and including an exciter field, comprising a variable resistor, an armature operatively connected thereto, a spring biasing a portion of the armature to tend to operate said resistor in the direction to produce an increase of the exciter field current, a first winding tending to operate the armature in the opposite direction upon an increase of said voltage, a second winding quickly responsive to an electrical condition of the exciter field and acting upon the armature as a follow-up promptly limiting the change of resistance of said resistor upon a change of said voltage, and a reset means for said second winding effective to substantially eliminate the stated follow-up in a retarded manner, said reset means being operatively connected to the line to set up a follow-up compensating action in accordance with the line current in a relatively retarded manner due to the slower response of the line current than of the exciter field current to a change of said resistance.

6. A line voltage regulating system for a generator supplying line current to a variable load and including an exciter field, comprising, a carbon pile, an armature operatively connected thereto for varying the electrical resistance of said carbon pile, a spring biasing a portion of the armature to tend to adjust said carbon pile in a direction to produce an increase in the exciter field current, a first electromagnetic winding tending to operate the armature in the opposite direction in response to an increase in the line voltage of said generator, a second electromagnetic winding connected in series with the exciter field and quickly responsive to changes in the exciter field current, said second electromagnetic winding acting upon the armature as a follow-up promptly limiting the change of resistance of said carbon pile upon a change in the line voltage, a third electromagnetic winding connected across the exciter field winding and acting more slowly upon the armature as a follow-up limiting the change of resistance of said carbon pile, a transformer having a primary winding, and a secondary winding, the primary winding connected in the line of said generator, a control circuit connecting said secondary winding in circuit with said second electromagnetic winding so as to set up a compensating action in accordance with the line current to substantially eliminate the stated follow-up in a relatively retarded manner due to a slower response of the line current than of the exciter field current to a change of the resistance of said carbon pile.

7. The regulating system set forth in claim 6 in which the secondary winding of said transformer has a time constant sufficiently large as to further delay the stated follow-up eliminating action.

HAROLD G. HAAS.

REFERENCES CITED

The following references are of record in the file of this patent:

UNITED STATES PATENTS

| Number | Name | Date |
|---|---|---|
| 1,146,925 | Conrad | July 20, 1915 |
| 2,298,536 | Logan | Oct. 13, 1942 |